B. HADLEY & B. MOYLAN.
SHARPENER FOR LAWN MOWERS.
APPLICATION FILED NOV. 10, 1909.
950,445.
Patented Feb. 22, 1910.
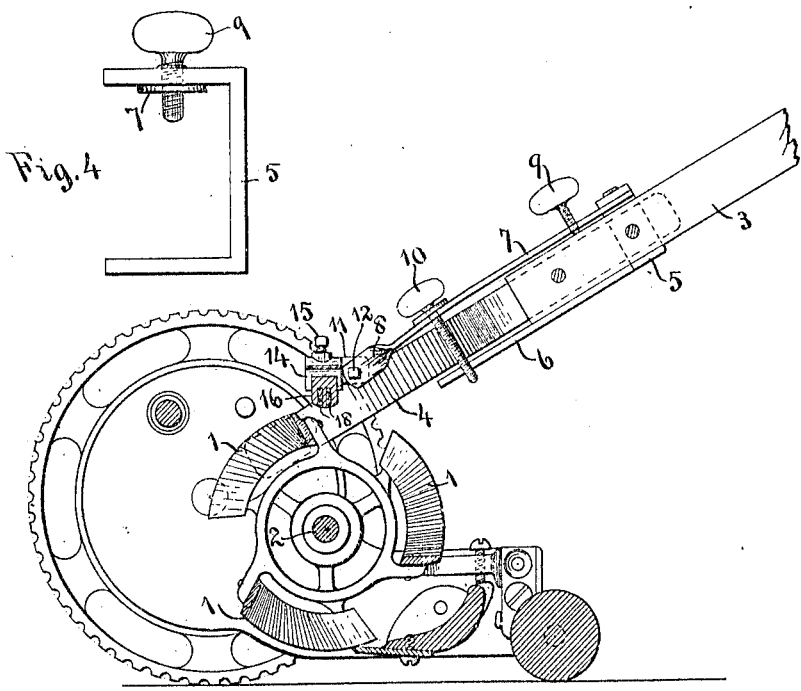
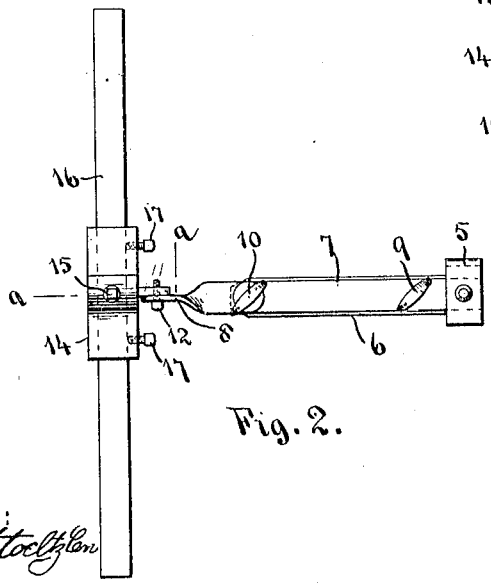
WITNESSES:
Chas. L. Stockton
M. E. Verbeck.
INVENTORS
Benjamin Hadley
and Bryan Moylan
BY
Eugene Diven
ATTORNEY

UNITED STATES PATENT OFFICE.

BENJAMIN HADLEY AND BRYAN MOYLAN, OF ELMIRA, NEW YORK; SAID HADLEY ASSIGNOR TO SAID MOYLAN.

SHARPENER FOR LAWN-MOWERS.

950,445.   Specification of Letters Patent.   Patented Feb. 22, 1910.

Application filed November 10, 1909. Serial No. 527,319.

*To all whom it may concern:*

Be it known that we, BENJAMIN HADLEY and BRYAN MOYLAN, citizens of the United States, residing at Elmira, in the county of Chemung and State of New York, have invented certain new and useful Improvements in Sharpeners for Lawn-Mowers, of which the following is a specification.

This invention relates to improvements in means for sharpening the rotary knives of lawn mowers; and our object is to provide a sharpening attachment which may be readily secured to the handle of a lawn mower, and so positioned and adjusted as to grind the cutting edges of the knives to a true and even edge when running the machine over the ground.

We attain our object by constructing the sharpening attachment in the manner illustrated in the accompanying drawings, in which—

Figure 1 presents a vertical section through the knives of a mowing machine at one side of the handle; Fig. 2, a plan view of the sharpening attachment removed from the machine; Fig. 3, a detail showing a section on the line *a*—*a* in Fig. 2; and Fig. 4, a rear elevation of the clip by means of which the attachment is fastened to the handle of the machine.

Like numerals designate like parts in the several views.

As shown in Fig. 1, the knives 1, 1, 1, of the lawn mower are fastened to and rotate with a shaft 2, driven by the driving wheel gears in the usual manner. A portion of the handle is shown at 3, said handle being attached to the frame of the machine by curved side pieces, pivotally attached to the gear cases in the usual manner, one of said side pieces being shown at 4.

For fastening our attachment to the handle we provide a clip 5, open at one side so as to be slipped laterally over the handle, the clip being provided at its underside with an extension arm 6, adapted to engage the underside of the handle, and said parts being formed of cast iron or other suitable metal. To the upper arm of the clip is riveted a bar of rolled steel 7, which extends forward to form a spring arm, and is provided with a vertical eye piece 8. A thumb screw is provided at 9 in the bar 7, to clamp the attachment in place upon the handle. At 10 an adjusting screw passes through the bar 7, and screws into the arm 6. The eye piece 8 is fastened by a set screw 12 to a block 11, which, in turn, is provided with a projecting pin 13, upon which is slidably mounted a metal holder for the sharpening bar, a set screw 15 being provided to fasten the holder in longitudinal and angular adjustment upon the pin 13. The holder 14 is slotted upon its underside to receive the sharpening bar 16, said bar being fastened in place in the holder by means of two set screws 17. This sharpening bar may be made in different ways, but for attaining the best results we preferably make it in the form of a piece of hard wood of a length corresponding to that of the knives of the lawn mower. Two longitudinal grooves are cut through the underside of the wooden bar and filled with a mixture of glue and emery, or other suitable abrasive material, as shown more clearly at 18 in Fig. 3 of the drawings; the bottom of the sharpening bar being preferably made convex, as shown in said figure. As so constructed, the wood acts to prevent the too rapid wearing away of the abrasive material and serves as a polisher to give to the knives a smooth and keen cutting edge. As the bar wears away its grinding edge becomes concaved to fit the curve of the knives.

After slipping the attachment onto the handle of the machine, and adjusting it longitudinally thereupon until the sharpening bar is in approximately the position shown in Fig. 1 of the drawings, the attachment is fastened in place by the thumb screw 9. The screw 10 is then passed through the bar 7, and screwed into the arm 6 until the sharpening bar is brought near the edges of the knives. The sharpening bar is then adjusted to properly engage the knives by loosening the set screws 12 and 15 and turning the bar on the eye piece 8 and on the pin 13, and moving it longitudinally on the pin so as to place the bar in even longitudinal engagement with the knives from one end thereof to the other, and in radial alinement with their axis of rotation. The pressure of the sharpening bar upon the knives will then be regulated by the adjusting screw 10. After the knives have been sharpened, by running the mower on the ground or preferably a smooth sidewalk, the sharpening bar may be removed from engagement with the knives by simply loosening the screw 10, in which position the machine is left free for mowing, without removing the attachment from the machine. Thus, having once been adjusted, the attachment may be left upon the machine, and the grinding of the knives carried on from time to time, by simply bringing the grinding bar into contact with the knives by means of the adjusting screw 10. The attachment may be readily taken off, if so desired, by removing the screw 10 and loosening screw 9, without disturbing the other adjustments.

What we claim as our invention, and desire to secure by Letters Patent is—

1. A sharpener for lawn mowers comprising a sharpening bar, a holder for said bar, a spring bar upon which the holder is held adjacent the knives, means for fastening the spring bar upon the handle of a mower, and means for bending said bar to move the sharpening bar to and from the knives.

2. A sharpener for lawn mowers comprising a sharpening bar, a holder for said bar, a spring bar upon which the holder is mounted, means for angularly adjusting the holder on the spring bar, means for fastening the spring bar upon the handle of a mower, and means for bending said bar to move the sharpening bar to and from the knives.

3. A sharpener for lawn mowers comprising a sharpening bar, a holder having a groove to receive said bar and provided with a clamping screw or screws to fasten the bar in longitudinal adjustment therein, means for fastening the holder upon the handle of a mower, and means for adjusting the holder to place the sharpening bar in grinding position relatively to the knives.

4. A sharpener for lawn mowers comprising a sharpening bar, a holder for said bar, a block having a pin upon which the holder is transversely mounted, means for fastening the holder in adjustment upon the pin, a bar on one end of which the block is pivotally mounted, means for fastening the block in pivotal adjustment, and means for fastening said bar upon the handle of a mower.

5. A sharpener for lawn mowers comprising a sharpening bar, a holder for said bar, a spring bar upon which the holder is mounted, a clip adapted to be placed upon the handle of a mower, to which clip the spring bar is fastened above the handle, a rigid arm projecting from the clip in engagement with the underside of the handle, an adjusting screw passing through the spring bar into engagement with said arm, and a clamping screw for fastening the clip upon the handle.

In testimony whereof we have affixed our signatures, in presence of two witnesses.

BENJAMIN HADLEY.
BRYAN MOYLAN.

Witnesses:
EUGENE DIVEN,
M. E. VERBECK.